(12) United States Patent
Yamazato et al.

(10) Patent No.: US 7,672,118 B2
(45) Date of Patent: Mar. 2, 2010

(54) ELECTRONIC APPARATUS

(75) Inventors: Kenji Yamazato, Ome (JP); Masakazu Nakamura, Tachikawa (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 0 days.

(21) Appl. No.: 12/144,148

(22) Filed: Jun. 23, 2008

(65) Prior Publication Data

US 2008/0316686 A1    Dec. 25, 2008

(30) Foreign Application Priority Data

Jun. 25, 2007    (JP) .................... P2007-166429

(51) Int. Cl.
H05K 5/00 (2006.01)
H05K 7/00 (2006.01)

(52) U.S. Cl. .............................. 361/679.02; 455/575.1; 361/679.55; 361/679.56

(58) Field of Classification Search ............ 361/679.02, 361/679.55, 679.56; 455/575.1
See application file for complete search history.

(56) References Cited

U.S. PATENT DOCUMENTS

2005/0134717 A1    6/2005    Misawa

2005/0263600 A1 *  12/2005   Yang et al. .............. 235/472.01

FOREIGN PATENT DOCUMENTS

JP    2005-090707 A    4/2005

OTHER PUBLICATIONS

Extended European Search Report dated Oct. 7, 2008, issued in a counterpart European Application.

* cited by examiner

*Primary Examiner*—Jayprakash N Gandhi
*Assistant Examiner*—Anthony M Haughton
(74) *Attorney, Agent, or Firm*—Frishauf, Holtz, Goodman & Chick, P.C.

(57) ABSTRACT

According to one embodiment, an electronic apparatus includes: a main body that has a bearing hole having a first retaining portion and a second retaining portion; a sub module that has a shaft rotatably coupling with the bearing hole so that the sub module moves between a first position and a second position; and a detent spring that is coupled with the shaft to keep the sub module at the first position and at the second position, the detent spring having a third retaining portion, wherein the third retaining portion couples with the first retaining portion when the sub module is kept at the first position, and wherein the third retaining portion couples with the second retaining portion when the sub module is kept at the second position.

7 Claims, 17 Drawing Sheets

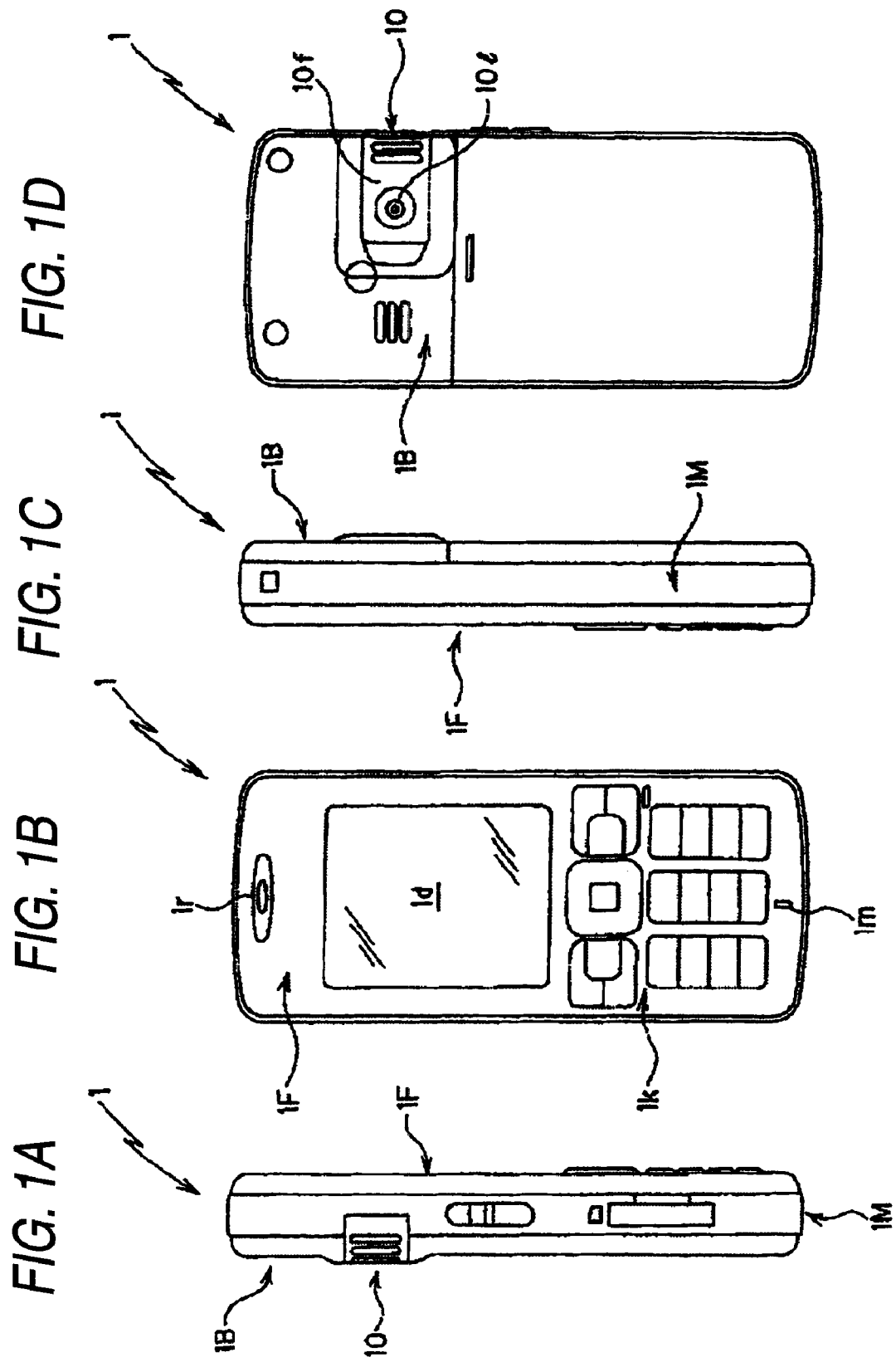

FIG. 7
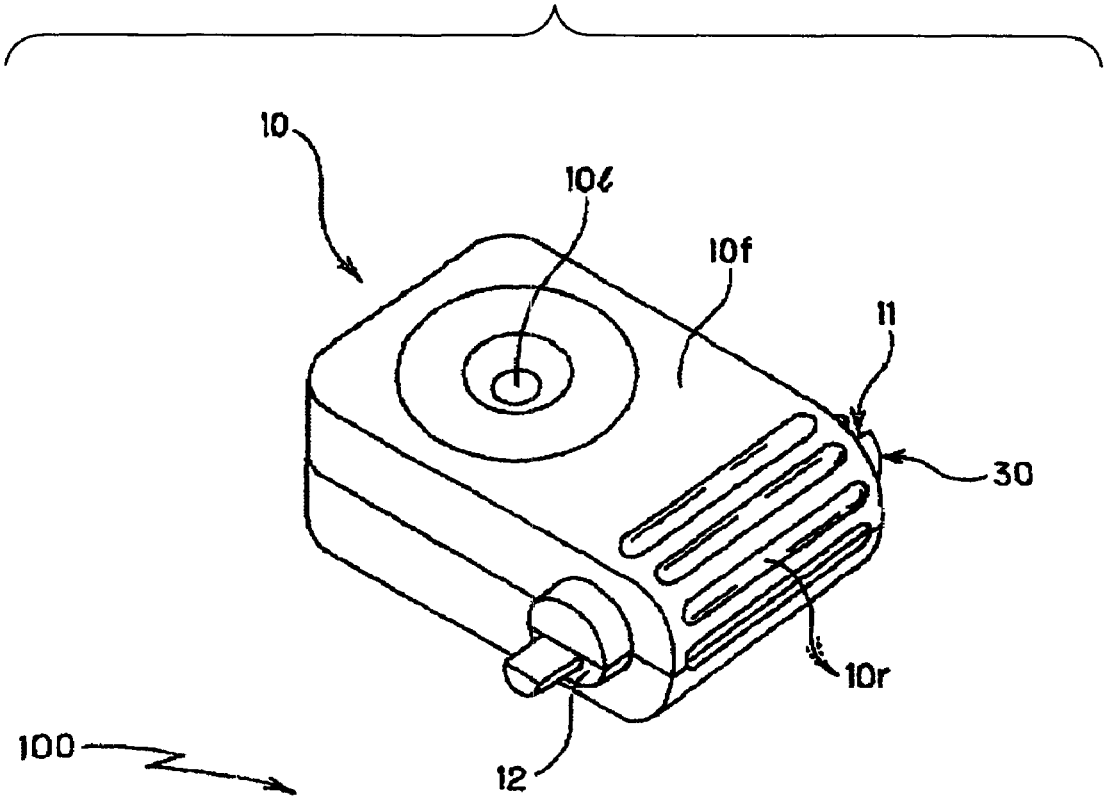
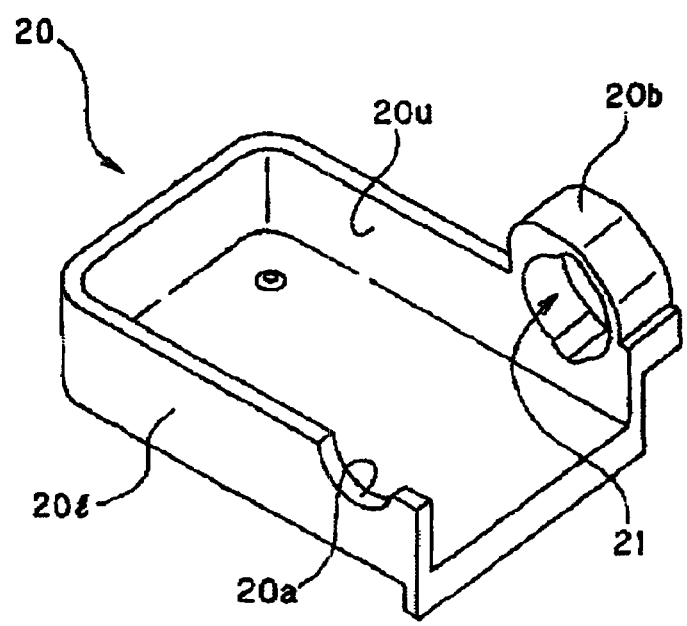

ELECTRONIC APPARATUS

CROSS-REFERENCE TO RELATED APPLICATIONS

This application is based upon and claims the benefit of priority from Japanese Patent Application No. 2007-166429, filed Jun. 25, 2007, the entire contents of which are incorporated herein by reference.

BACKGROUND

1. Field

One embodiment of the invention relates to an electronic apparatus including a sub-module which is supported so as to rotatably move between a storage position and an expansion position with respect to an apparatus case, and more particularly to a detent mechanism for supporting the sub-module at the storage position and the expansion position.

2. Description of the Related Art

In recent years, there has been provided an electronic apparatus such as a cellular phone having a camera function in which a camera module (sub-module) receiving a camera mechanism such as a lens is supported so as to rotately move between at a storage position and an expansion position with respect to an apparatus case in order to realize various photographing styles (for example, see JP-A-2005-90707).

A known cellular phone A shown in FIG. 14 includes a camera module (sub-module) C in an end of an apparatus case B. The camera module C is supported so as to rotatably move to be reversed about an axis O-O between a storage position where a lens unit C1 is oriented to the front surface, as shown in FIG. 14(a) and an expansion position where the lens unit C1 is oriented to the back surface, as shown in FIG. 14(b).

Moreover, the camera module C is configured to be held at the storage position in FIG. 14(a) and at the expansion position in FIG. 14(b) by a detent mechanism described below.

As shown in FIGS. 15 and 16, the camera module C is supported by a holder H disposed in the apparatus case B (see FIG. 14) through a rod R fixed to the camera module C. In addition, a flexible board E connected to the camera module C is extracted from the holder H.

A slider S engages with a guide G fixed to the rod R so as not to move in a shaft direction and not to rotatably move. In addition, the slider S is received in the inside of the holder H so as to be movable.

The slider S is urged toward the bottom surface of the holder H by a compression spring F mounted between the slider S and the guide G. In addition, the camera module C is configured so as to be held at the storage position or the expansion position by engaging a detent protrusion Hp formed in the holder H with a detent groove Sg of the slider S.

In the known cellular phone A, the detent mechanism for holding the camera module C at the storage position and the expansion position includes numerous elements such as the holder H formed with the detent protrusion Hp, the slider S formed with the detent groove Sg, the guide G for guiding the slider S, and the compression spring F for urging the slider S, as described above. Accordingly, the configuration becomes complicated and the above-described constituent elements are laid out along the rod R, thereby causing occupation of a space.

SUMMARY

According to one embodiment of the invention, there is provided an electronic apparatus including: a main body that has a bearing hole having a first retaining portion and a second retaining portion; a sub module that has a shaft rotatably coupling with the bearing hole so that the sub module moves between a first position and a second position; and a detent spring that is coupled with the shaft to keep the sub module at the first position and at the second position, the detent spring having a third retaining portion, wherein the third retaining portion couples with the first retaining portion when the sub module is kept at the first position, and wherein the third retaining portion couples with the second retaining portion when the sub module is kept at the second position.

According to another embodiment of the invention, there is provided an electronic apparatus including: a main body that has a bearing hole; a sub module that has a shaft rotatably coupling with the bearing hole so that the sub module moves between a first position and a second position, the shaft having a first retaining portion and a second retaining portion; and a detent spring that is coupled with the bearing hole to keep the sub module at the first position and at the second position, the detent spring having a third retaining portion, wherein the third retaining portion couples with the first retaining portion when the sub module is kept at the first position, and wherein the third retaining portion couples with the second retaining portion when the sub module is kept at the second position.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 1(a), 1(b), 1(c), and 1(d) are exemplary left side view, an exemplary front side view, an exemplary right side view, and an exemplary rear side view illustrating a cellular phone as an example of an electronic apparatus according to an embodiment of the invention, respectively.

FIG. 7 is an exemplary exploded perspective view illustrating the camera module.

DETAILED DESCRIPTION

Hereinafter, an embodiment of the invention will be described in detail with reference to the drawings.

Figure 2A:
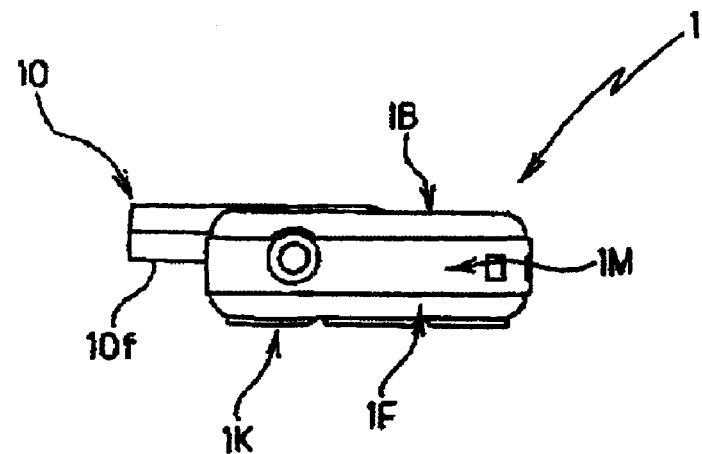
FIGS. 2(a) and 2(b) are an exemplary top view and an exemplary front view illustrating a state where a camera module is positioned at a storage position in the cellular phone in FIG. 1, respectively.
Figure 2B:
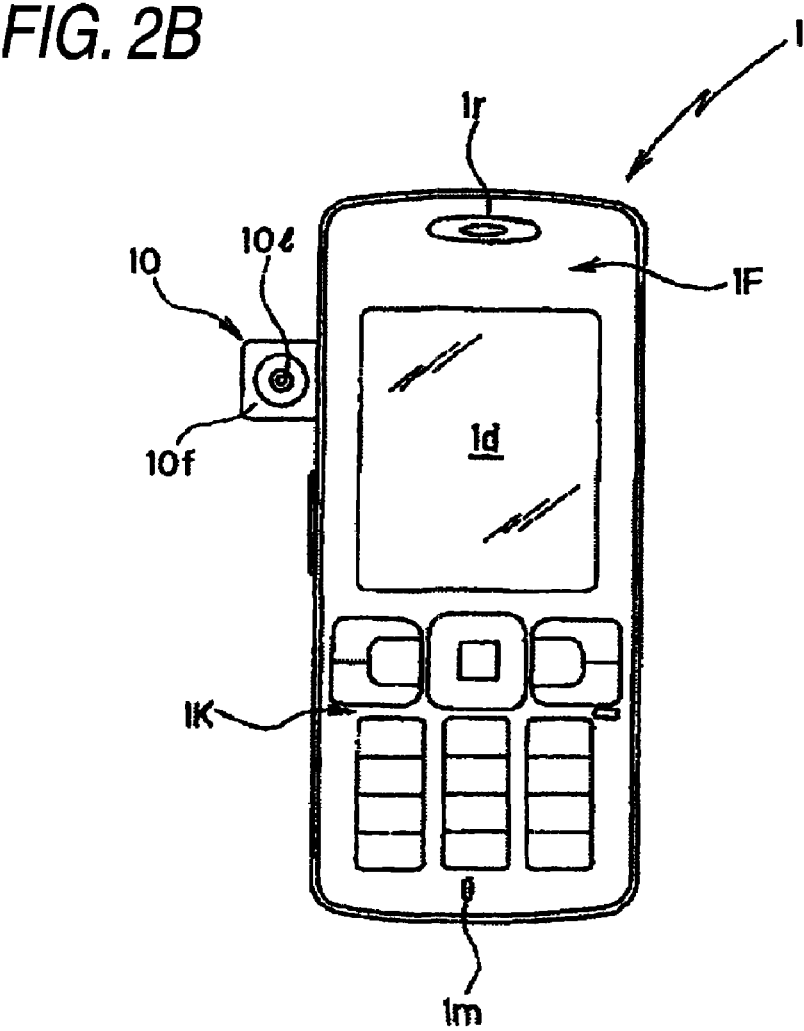
Figure 3A:
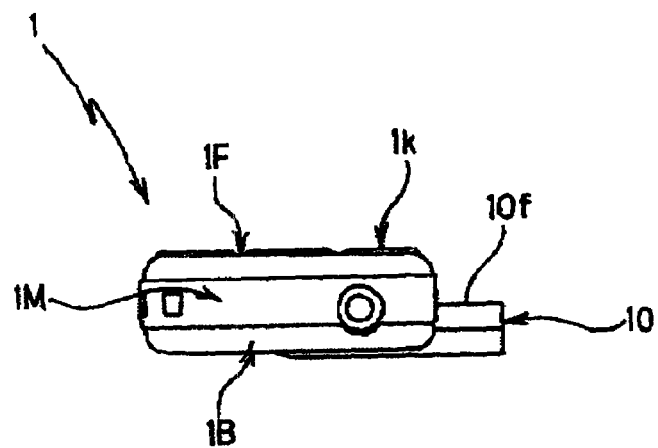
FIGS. 3(a) and 3(b) are an exemplary top view and an exemplary rear view illustrating a state where the camera module is positioned at an expansion position in the cellular phone in FIG. 1, respectively.
Figure 3B:
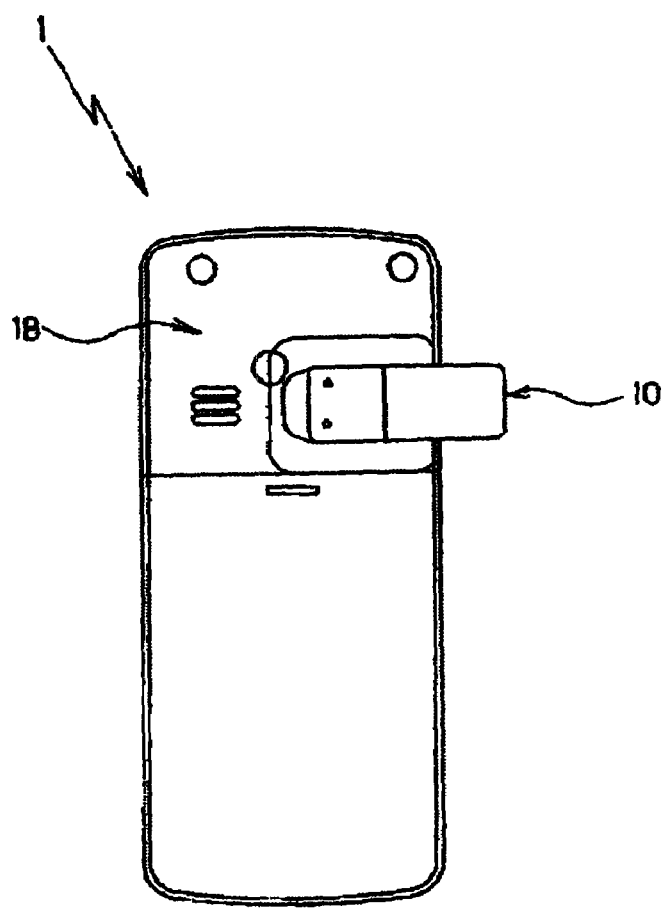

FIGS. 1 to 3 are diagrams illustrating a cellular phone, which is an example of an electronic apparatus according to the embodiment of the invention. An apparatus case of the cellular phone 1 is constituted by a middle case 1M, a front surface case 1F in the front of the middle case 1M, and a back surface case 1B in the back of the middle case 1M.

A large liquid crystal display screen 1d, an operation unit 1k including plural operation keys, an ear piece 1r, and a mount piece 1m are provided on the front surface case 1F of the cellular phone 1. On the other hand, a camera module 10, which is a sub module, is disposed on the back surface case (apparatus case) 1B of the cellular phone 1.

The camera module 10 includes camera elements such as a lens or an image pickup element. The camera module 10 is rotatably supported on the back surface case (apparatus case) 1B between a storage position which forms one surface with the back surface case 1B, as shown in FIG. 1, and an expansion position which protrudes from the back surface case 1B, as shown in FIGS. 2 and 3.

Moreover, the camera module 10 is held in the storage position (see FIG. 1) and the expansion position (see FIGS. 2 and 3) described above by a detent portion described in detail below.

In the cellular phone 1 described above, in a normal camera photographing mode, the camera module 10 is set to the storage position, and the back surface of a lens unit 10l of the camera module 10 is faced.

On the other hand, in a self photographing mode of a stationary image or a video, or in a television/telephone mode, the camera module 10 is set to the expansion position, and the front surface of the lens unit 10l of the camera module 10 is faced.

Figure 4:
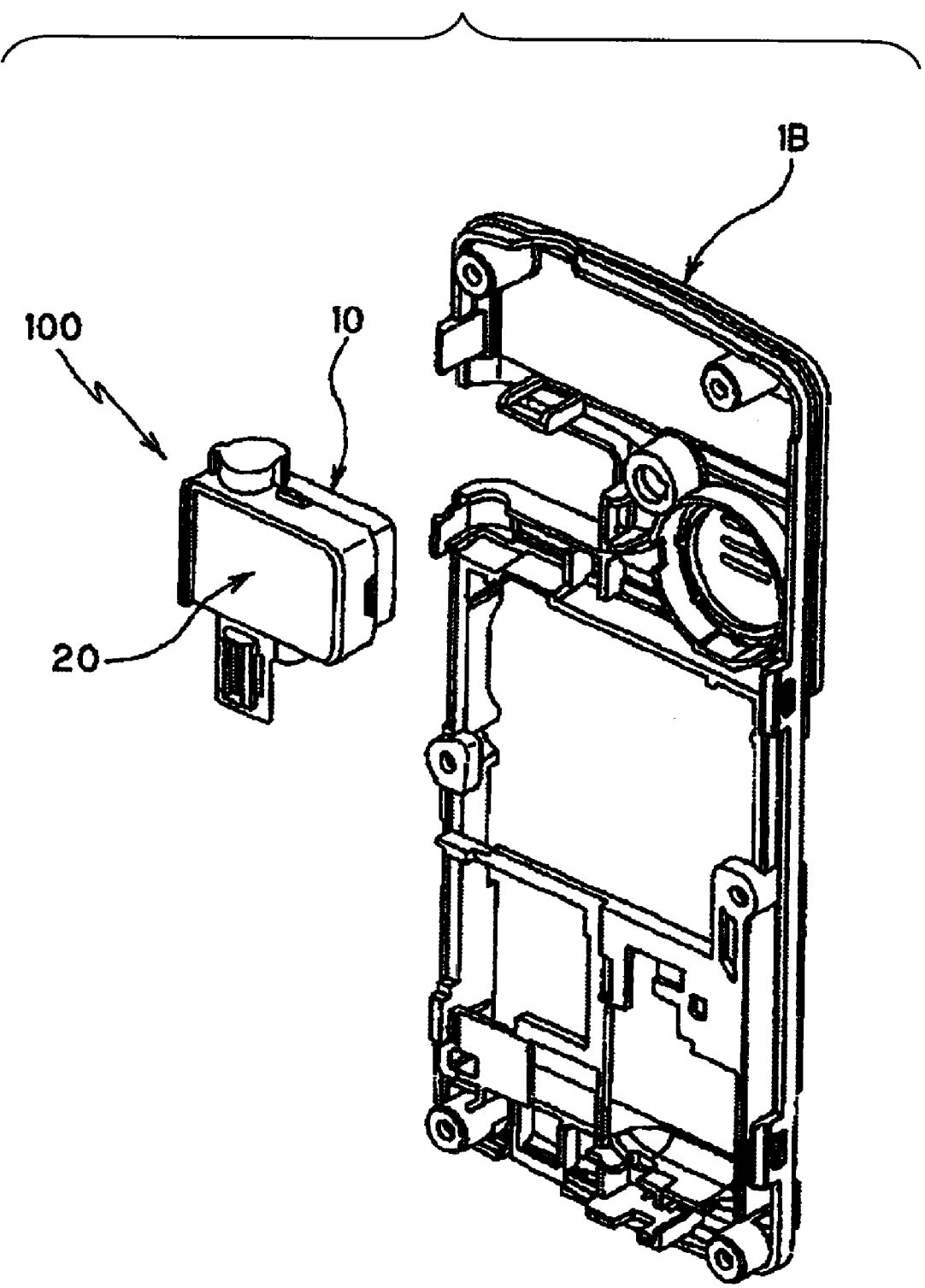
FIG. 4 is an exemplary exploded perspective view illustrating a back surface case and a camera module assembly in the cellular phone in FIG. 1.

As shown in FIG. 4, the camera module 10 is mounted in a module holder 20 which is incorporated into the back surface case 1B to substantially constitute the apparatus case. In addition, the camera module 10 and the module holder 20 constitute a camera module assembly 100.

Figure 5A:
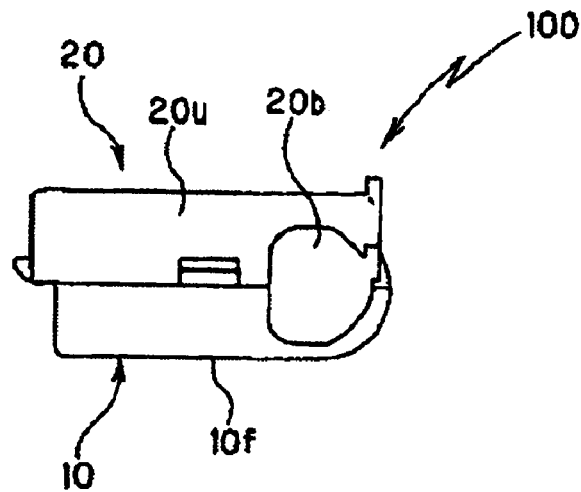
FIGS. 5(a), 5(b), and 5(c) are an exemplary top view, an exemplary front view, and an exemplary end view illustrating the camera module assembly in the state where the camera module is positioned at the storage position, respectively.
Figure 5B:
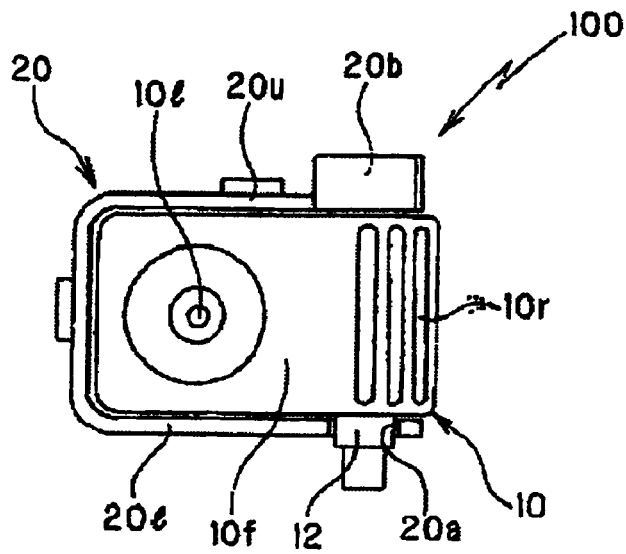
Figure 5C:
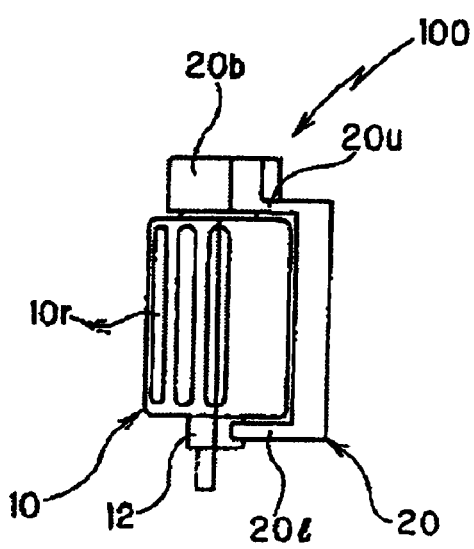
Figure 6A:
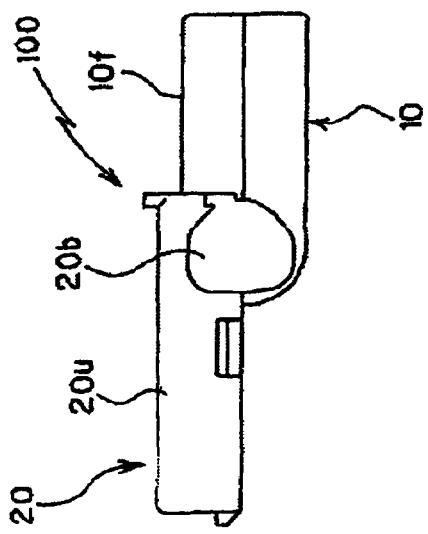
FIGS. 6(a), 6(b), and 6(c) are an exemplary top view, an exemplary front view, and an exemplary end view illustrating the camera module assembly in the state where the camera module is positioned at the expansion position, respectively.
Figure 6C:
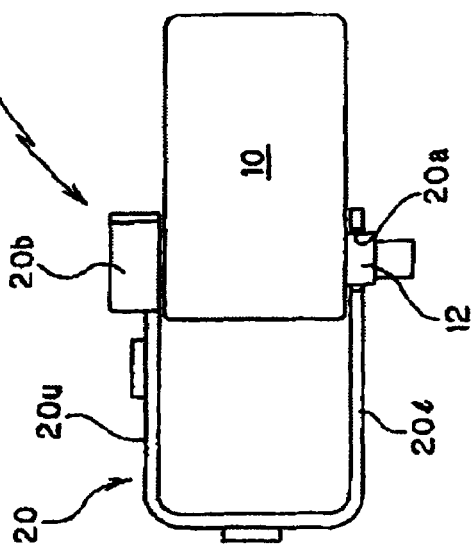
Figure 6B:
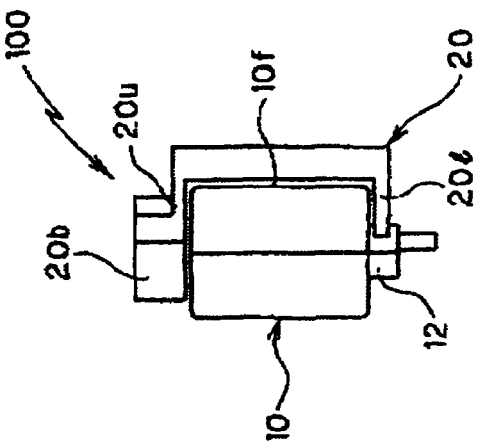

In the camera module assembly 100 which includes the camera module 10 and the module holder 20, as shown in FIG. 5, the camera module 10 is held at the storage position (see FIG. 1) in a state where the camera module 10 is received in the module holder 20. Moreover, as shown in FIG. 6, the camera module 10 is held at the expansion position (see FIGS. 2 and 3) in a state where the camera module 10 is reversed by 180°.

As shown in FIG. 7, the camera module 10 constituting the camera module assembly 100 receives camera elements such as a lens or an image pickup element in the inside of a substantially rectangular casing of which one end is formed in a semicircular column shape. The lens unit 10l is disposed on a front surface 10f of the casing Supporting shaft 11 and 12 protrude in upper and lower portion of one end of the camera module 10. In addition, a detent spring 30 described in detail below is mounted in the supporting shaft 11.

Knurling grooves 10r for facilitating a rotational movement of the camera module 10 by fingers of a user are formed on the outer surface of the one end of the camera module 10.

On the other hand, the module holder 20 constituting the camera module assembly 100 has a box-like shape for receiving the camera module 10. In addition, a bearing hole 21 for supporting the supporting shaft 11 of the camera module 10 is formed in a bracket 20b which protrudes from an upper plate 20u.

A half-moon groove 20a for supporting the supporting shaft 12 of the camera module 10 is formed on a lower plate 20l of the module holder 20. In addition, the supporting shaft 11 is inserted into a bearing hole 21 and the support shaft 12 engages with the half-moon groove 20a, so that the camera module 10 is rotatably supported with respect to the module holder 20.

Figure 8A:
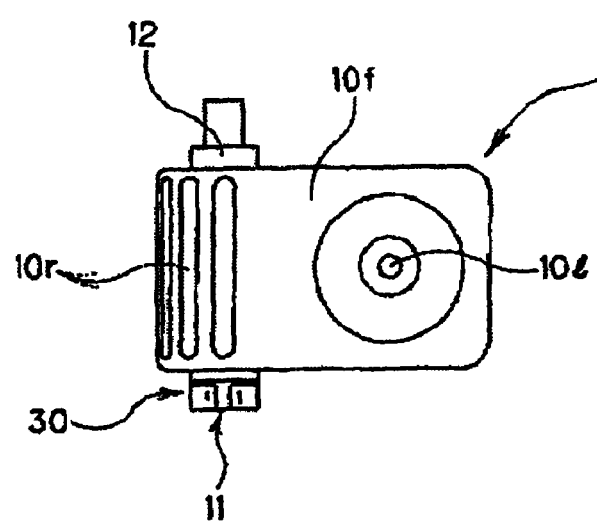
FIGS. 8(a), 8(b), and 8(c) are an exemplary front view, an exemplary side view, and an exemplary expanded side view illustrating the camera module, respectively.
Figure 8B:
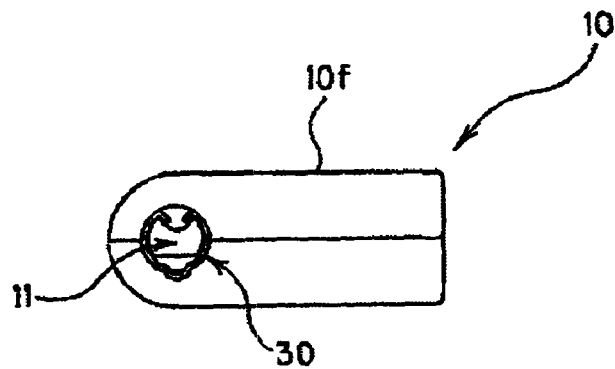
Figure 8C:
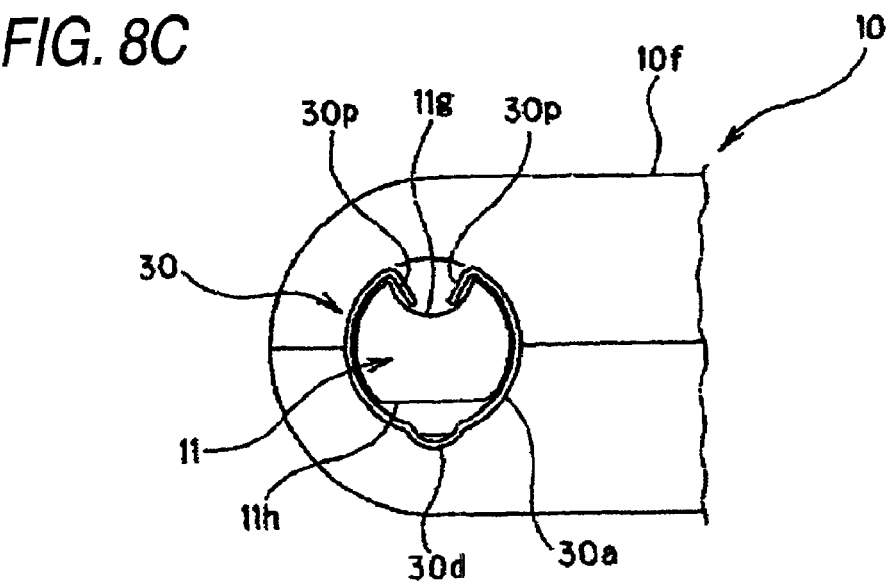
Figure 9A:
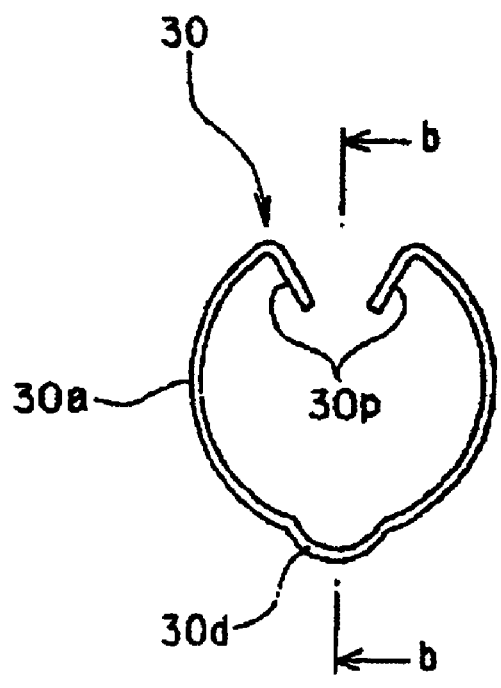
FIG. 9(a) is an exemplary front view illustrating a detent spring.
Figure 9B:
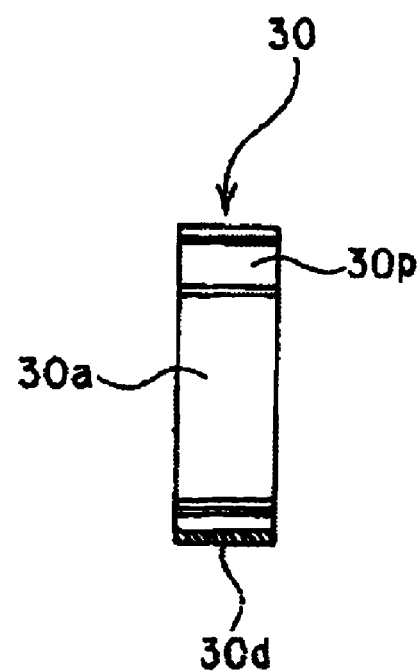
FIG. 9(b) is an exemplary sectional view taken along the line b-b shown in FIG. 9(a).
Figure 9C:
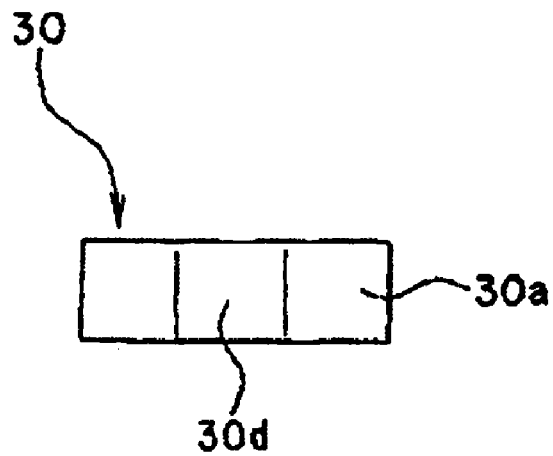
FIG. 9(c) is an exemplary side view illustrating the detent spring.

As shown in FIGS. 8 and 9, the detent spring 30 formed of a ring spring is mounted in the supporting shaft 11 of the above-described camera module 10. The detent spring 30 is mounted between the supporting shaft 11 and the bearing hole 21 in the state where the supporting shaft 11 of the camera module 10 is inserted into the bearing hole 21 of the module holder 20, as described above.

The detent spring 30 includes a ring portion 30a similar in shape to the outer circumference of the supporting shaft 11 and a pair of engagement claws 30p of which ends are bent. In addition, a detent protrusion 30d as a one-side holding engagement portion is formed so as to swell in a diameter outside direction.

A locking groove 11g which engages with the engagement claws 30p to prevent the rotation of the detent spring 30 with respect to the supporting shaft 11 is formed in the supporting shaft 11 in which the detent spring 30 is mounted. In the state where the detent spring 30 is mounted, a relief portion 11h for allowing the deformation of the detent protrusion 30d is notched at a position corresponding to the detent protrusion 30d when the camera module 10 rotatably moves, as described below.

Figure 10A:
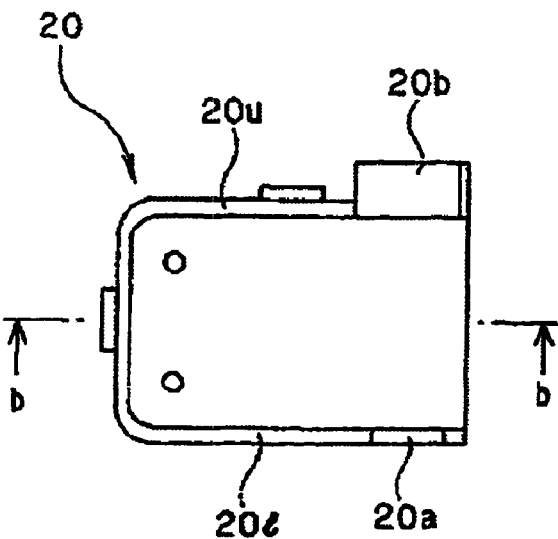
FIG. 10(a) is an exemplary front view illustrating a module holder.
Figure 10B:
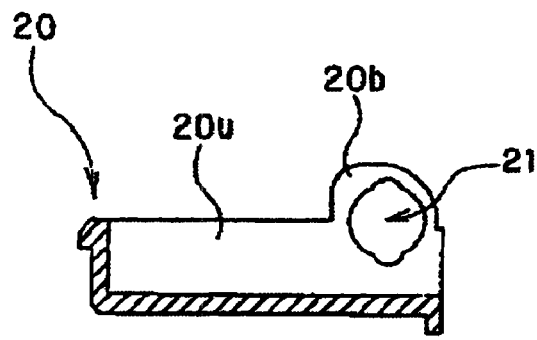
FIG. 10(b) is an exemplary sectional view taken along the line b-b shown in FIG. 10(a).
Figure 10C:
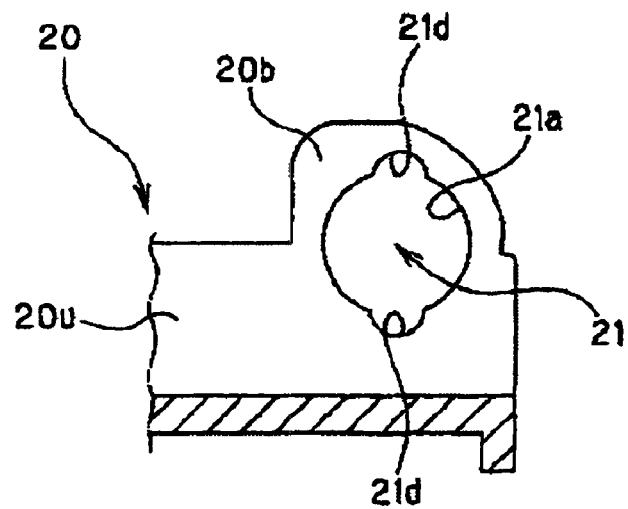
FIG. 10(c) is an expanded sectional view illustrating major elements of the module holder.

On the other hand, as shown in FIG. 10, the bearing hole 21 formed in the bracket 20b of the above-described module holder 20 includes a cylindrical portion 21a similar in shape to the ring portion 30a of the detent spring 30 mounted in the supporting shaft 11 of the camera module 10. In addition, above and below the cylindrical portion 21a, detent grooves 21d as an other-side holding engagement portion engaging with the detent protrusion 30d of the detent spring 30 are recessed at positions where central angles of 180° are set.

The detent protrusion 30d of the detent spring 30 mounted in the supporting shaft 11 of the above-described camera module 10 and the detent grooves 21d formed in the bearing hole 21 of the module holder 20 are combined to a detent mechanism for holding the camera module 10 at the storage position and the expansion position.

Figure 11A:
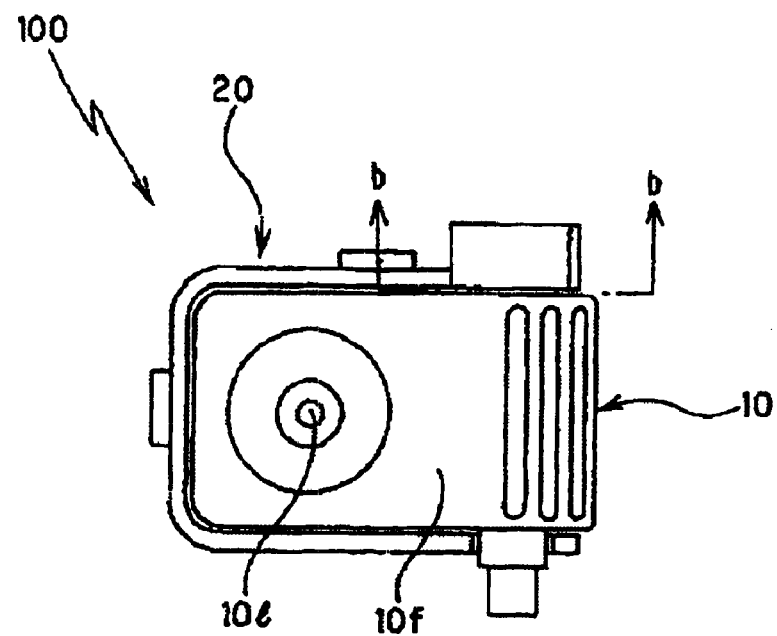
FIG. 11(a) is an exemplary front view illustrating an operation of the camera module assembly.
Figure 11B:
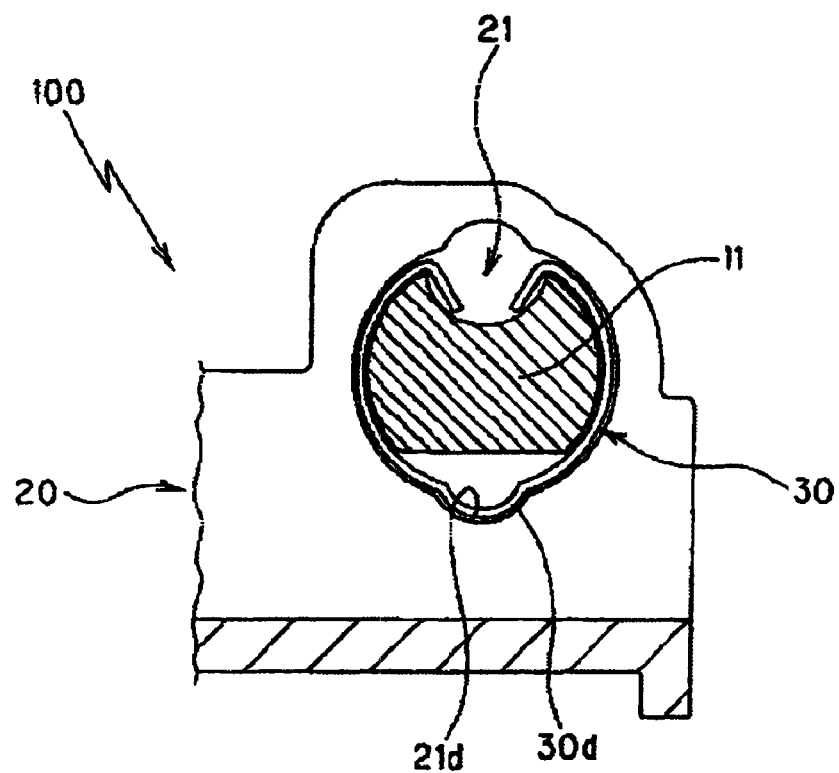
FIG. 11(b) is an exemplary sectional view taken along the line b-b shown in FIG. 11(a).

In the cellular phone 1 having the above-described configuration, as shown in FIG. 11, the camera module 10 is received in the module holder 20 in a state where the camera module 10 is positioned at the storage position. At this time, the camera module 10 is held at the storage position in a manner in which the detent protrusion 30d of the detent spring 30 mounted in the supporting shaft 11 of the camera module 10 engages with the lower detent groove 21d of the bearing hole 21 in the module holder 20.

Figure 12A:
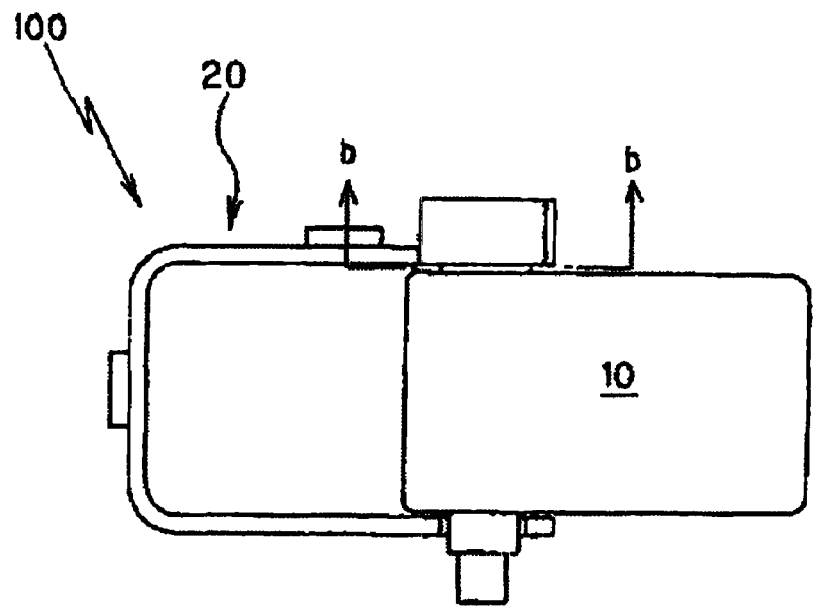
FIG. 12(a) is an exemplary front view illustrating the operation of the camera module assembly.
Figure 12B:
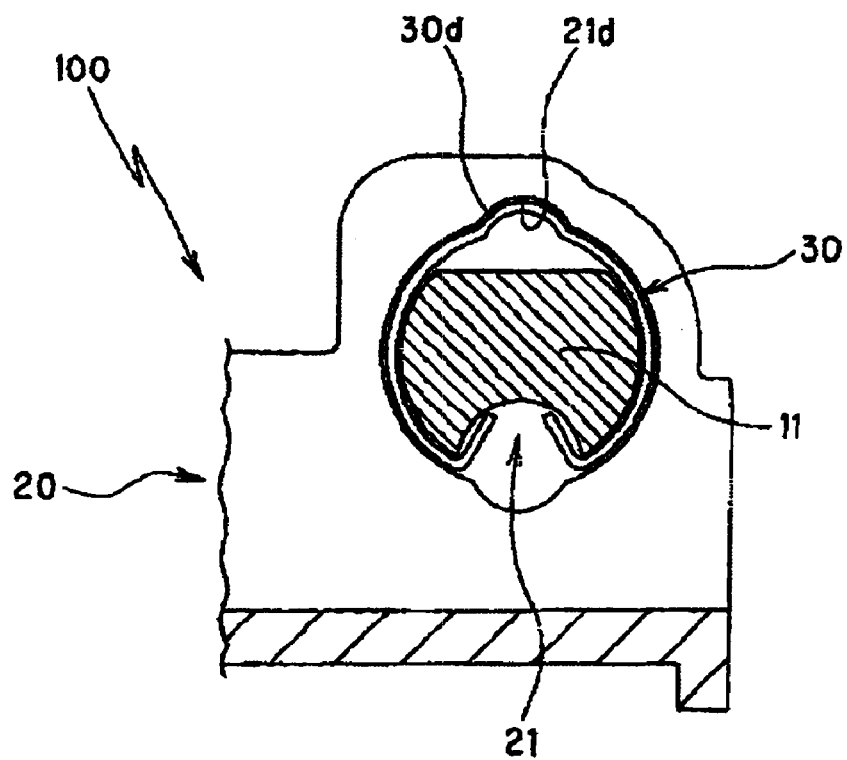
FIG. 12(b) is an exemplary sectional view taken along the line b-b shown in FIG. 12(a).

On the other hand, in a state where the camera module 10 is positioned at the expansion position, as shown in FIG. 12, the camera module 10 is extracted from the module holder 20. At this time, the camera module 10 is held at the expansion position in a manner in which the detent protrusion 30d of the detent spring 30 mounted in the supporting shaft 11 of the camera module 10 engages with the upper detent groove 21d of the bearing hole 21 in the module holder 20.

Figure 13A:
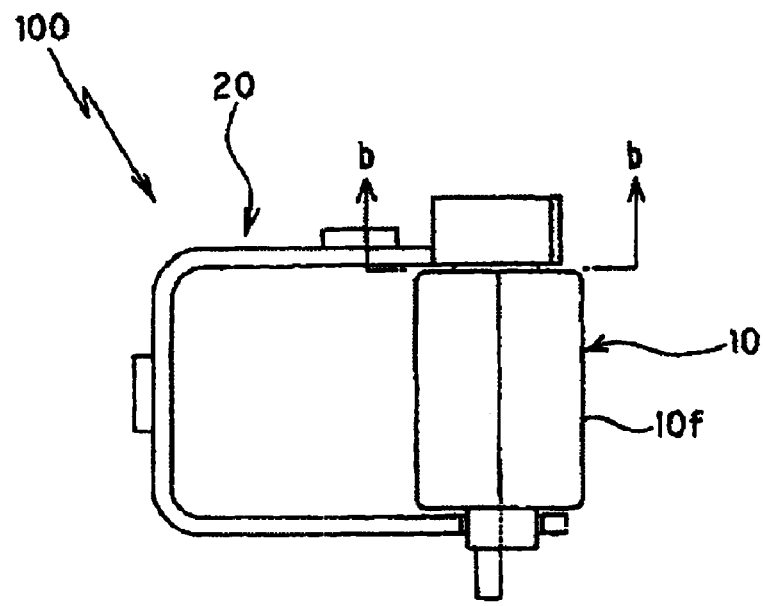
FIG. 13(a) is an exemplary front view illustrating the operation of the camera module assembly.
Figure 13B:
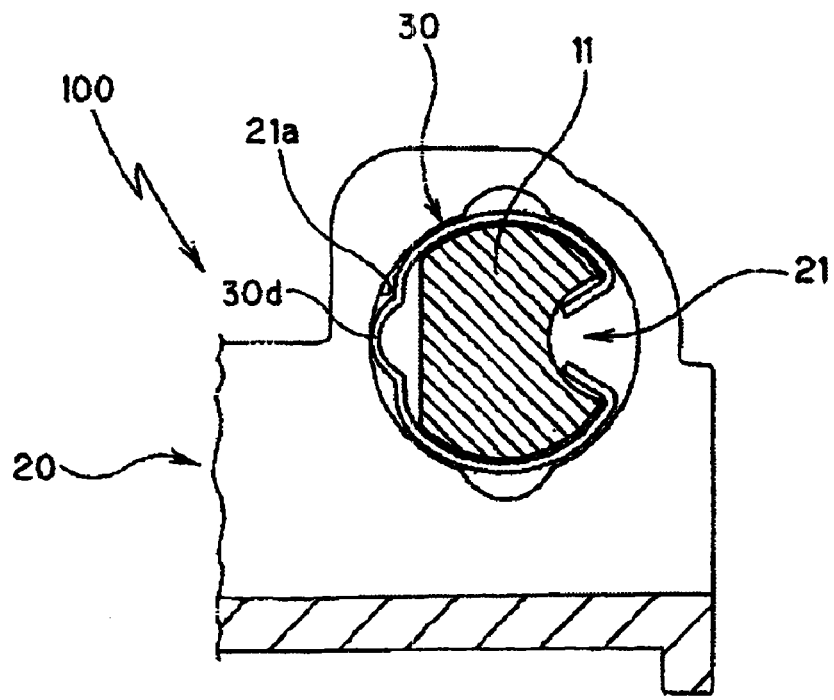
FIG. 13(b) is an exemplary sectional view taken along the line b-b shown in FIG. 13(a).
Figure 14A:
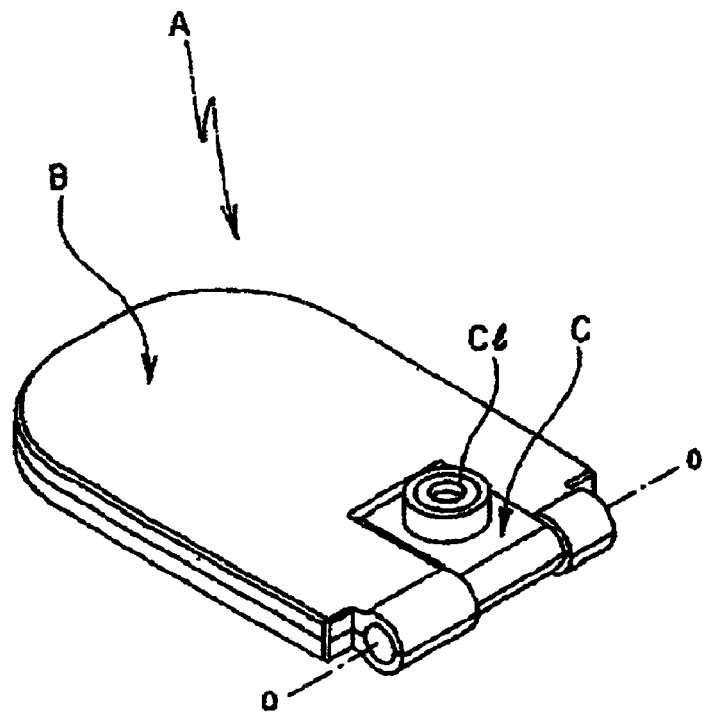
FIGS. 14(a) and 14(b) are exemplary perspective views illustrating an outer appearance of a cellular phone which is an example of a electronic apparatus.
Figure 14B:
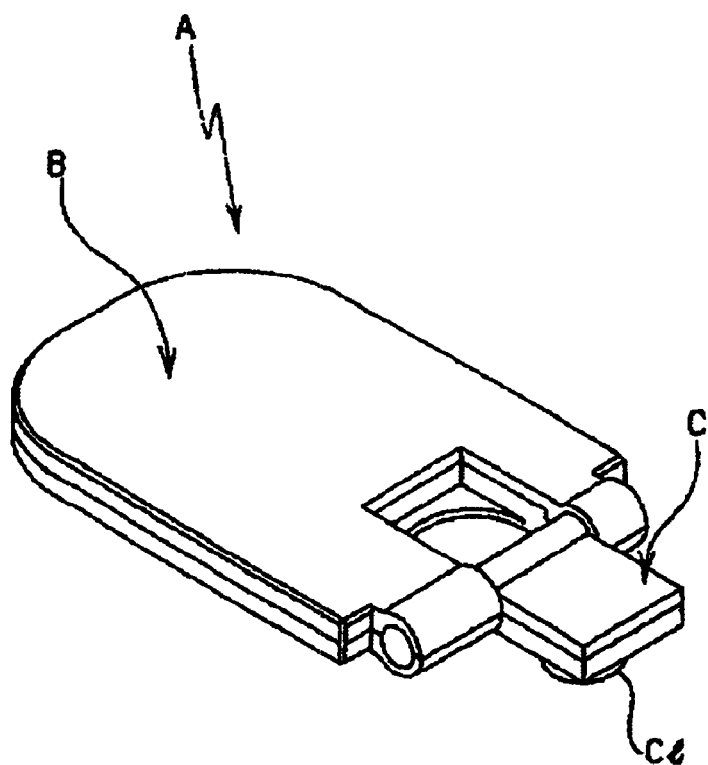
Figure 15:
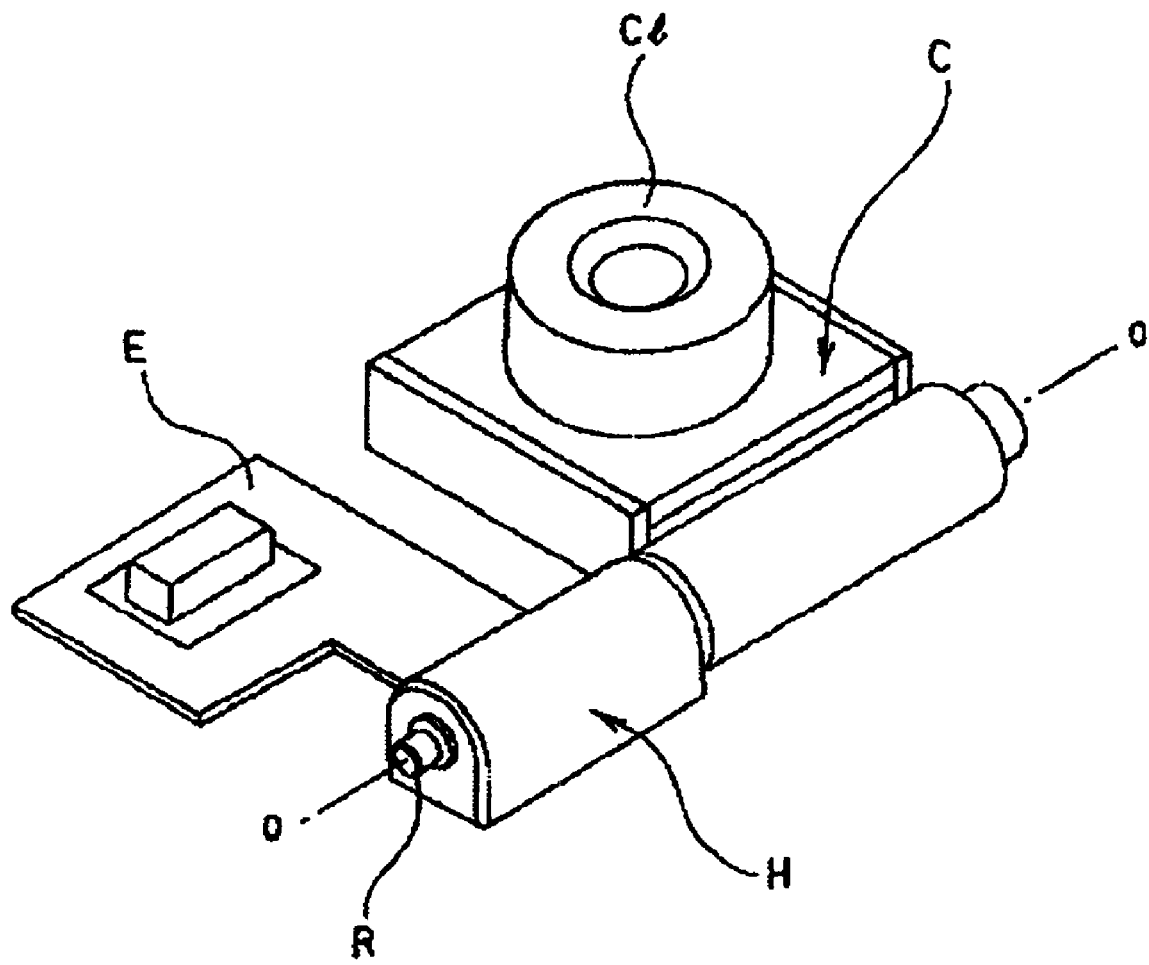
FIG. 15 is an exemplary perspective view illustrating a camera module and the like of the electronic apparatus.
Figure 16A:
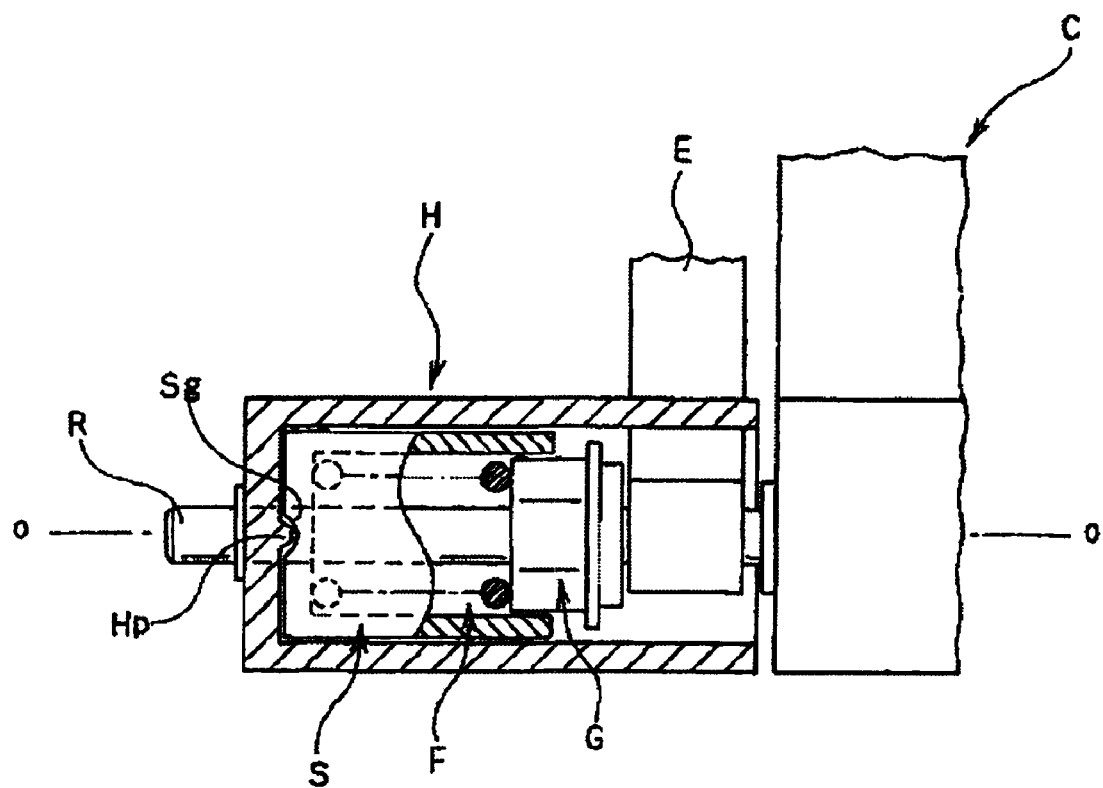
FIG. 16(a) is an exemplary sectional view illustrating major portions of a detent mechanism of the camera module.
Figure 16B:
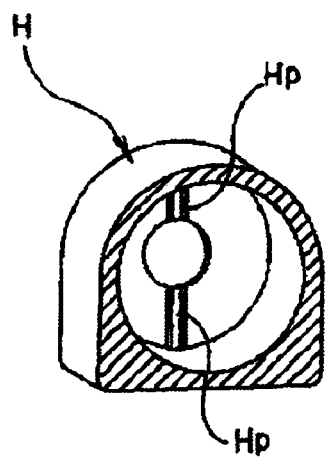
FIG. 16(b) is an exemplary perspective view illustrating an outer appearance of a holder member.
Figure 16C:
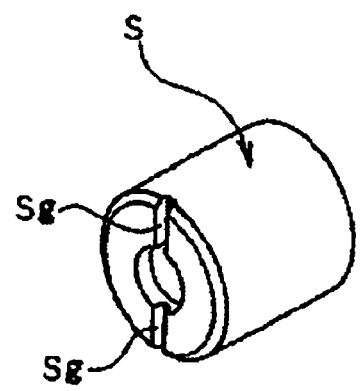
FIG. 16(c) is an exemplary perspective view illustrating a slide member.

When the camera module 10 is rotatably moved from the storage position to the expansion position or vice versa, as shown in FIG. 13, the detent protrusion 30d of the detent spring 30 comes out from the detent grooves 21d of the bearing hole 21 and comes in contact with the cylindrical portion 21a of the bearing hole 21 to be pressed and deformed in a state where the camera module 10 is rotatably moved by about 90° with respect to the module holder 20.

At this time, it is possible to rotatably move the camera module 10 in a smooth manner since the detent protrusion 30d of the detent spring 30 can be easily deformed by forming the relief portion 11h in the supporting shaft 11.

Moreover, an elastic restoring force of the pressed and deformed detent spring 30 allows the detent protrusion 30d to come in pressing contact with the cylindrical portion 21a of the bearing hole 21. Accordingly, it is possible to rotatably move the camera module 10 without occurrence of shaking or rattling.

When the camera module 10 is rotatably moved to the storage position or the expansion position in a state shown in FIG. 13, the camera module 10 is held at the storage position or at the expansion position since the elastic restoring force allows the detent protrusion 30d of the pressed and deformed detent spring 30 with the detent groove 21d of the bearing hole 21.

In this case, when the camera module 10 is held at the storage position or at the expansion position, clicking can be sensed by the fingers of a user by fitting the detent protrusion 30d into the detent grooves 21d. Accordingly, the fact that the camera module 10 becomes held at a predetermined position can be sensed even though the fact is not checked with the naked eyes.

In the cellular phone 1 having the above-described configuration, the detent protrusion 30d (one-side holding engagement portion) of the detent spring 30 mounted between the supporting shaft 11 of the camera module 10 and the bearing hole 21 of the module holder 20 and the detent grooves (other-side holding engagement portion) 21d formed in the bearing hole 21 of the module holder 20 are combined to form the detent mechanism for positioning the camera module 10. With such a configuration, it is possible to realize a simple configuration in which the number of constituent elements of the detent mechanism is small and to reduce the space for the constituent element, compared with known electronic apparatuses.

In the cellular phone 1 having the above-described configuration, the detent protrusion 30d as the one-side holding engagement portion is formed in the detent spring 30 fixed to the supporting shaft 11 of the camera module 10 and the detent grooves 21d as the other-side holding engagement portion is formed in an inner circumference of the bearing hole 21 of the module holder 20. With such a configuration, it is possible to realize the simple configuration in which the number of the detent mechanism is small and to reduce the space, compared with the known electronic apparatuses.

In the cellular phone 1 having the above-described configuration, the relief portion 11h for allowing the deformation of the detent protrusion 30d of the detent spring 30 is formed in the outer circumference of the supporting shaft 11 in the camera module 10. With such a configuration, the detent protrusion 30d of the detent spring 30 is easily deformed and the detent protrusion 30d is not caught in the inner circumference of the bearing hole 21 when the camera module 10 is rotatably moved. Accordingly, it is possible to rotatably move the camera module 10 in a smooth manner.

Figure 17A:
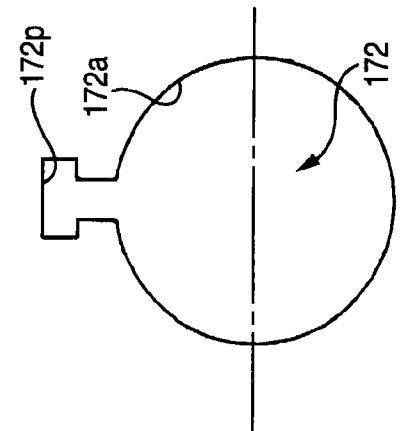
FIG. 17(a), 17(b), and 17(c) are an exemplary sectional view of a shaft, an exemplary sectional view of a detent spring, and an exemplary sectional view.
Figure 17B:
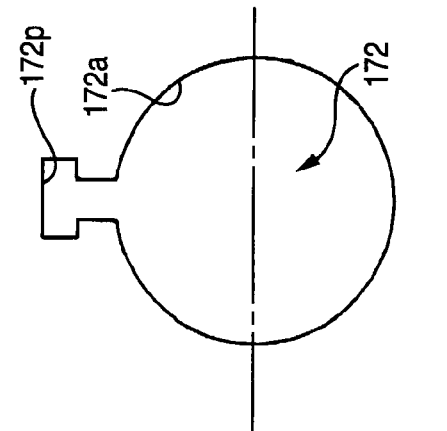
Figure 17C:
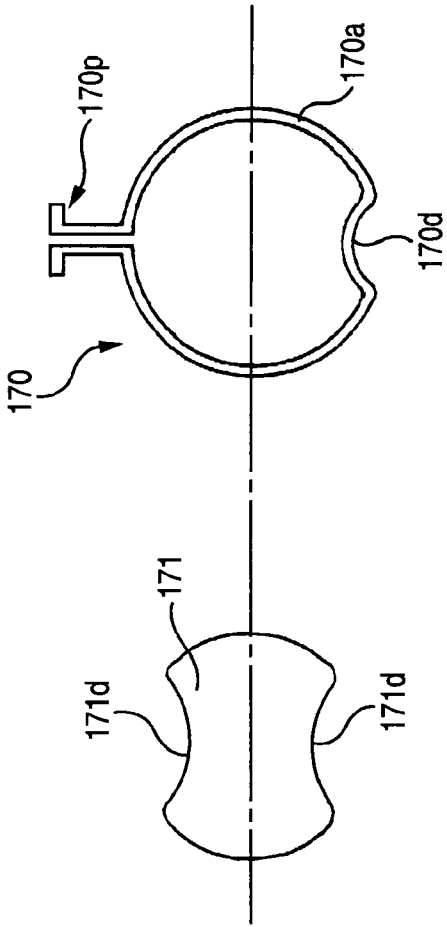
Figure 17D:
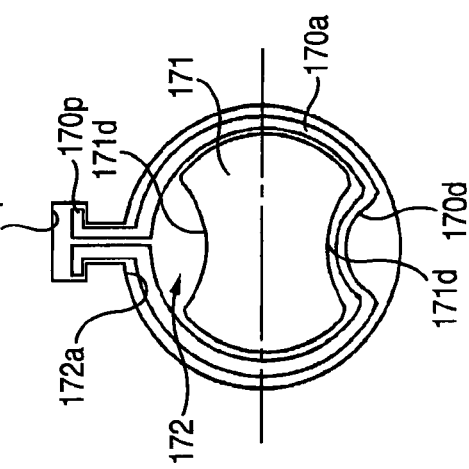
FIG. 17(d) is an exemplary sectional view showing that the shaft of FIG. 17(a) and the detent spring of FIG. 17(b) are assembled into the bearing hole of FIG. 17(c).

In the above-described embodiment, the supporting shaft 11 is formed in the camera module 10, the bearing hole 21 is formed in the module holder 20, and the detent spring 30 is fixed to the supporting shaft 11 of the camera module 10. However, the detent spring 30 may be fixed to the bearing hole 21 of the module holder 20. In particular, as shown in FIG. 17(A) to 17(C), the electronic apparatus includes: a main body that has a bearing hole 172; a sub module that has a shaft 171 rotatably coupling with the bearing hole 172 so that the sub module moves between a first position and a second position, the shaft 171 having retaining portion 171d and a second retaining portion 171d; and a detent spring 170 that is coupled with the bearing hole 172 to keep the sub module at the first position and at the second position, the detent spring 170 having a third retaining portion 170d. The third retaining portion 170d couples with the first retaining portion 171d when the sub module is kept at the first position, and wherein the third retaining portion 170d couples with the second retaining portion 171d when the sub module is kept at the second position. The bearing hole has a T-hole on an inner wall 172a to keep a T-portion 170p. As shown in FIG. 17(D), the shaft 171 is kept in the detent spring 170, and the shaft 171 and the detent spring 170 are kept in the bearing hole 172.

Moreover, the supporting shaft may be formed in the module holder 20, the bearing hole may be formed in the camera module 10, and the detent spring 30 may be fixed to one of the supporting shaft and the bearing hole.

In the above-described embodiment, two detent grooves 21d are formed at the two positions of the inner circumference of the bearing hole 21 in the module holder 20 in order to hold the camera module 10 at the two positions of the storage position and the expansion position. However, the number of the detent grooves 21d may be appropriately configured in accordance with the number of the holding positions of the camera module 10.

In the above-described embodiment, the invention is applied to the cellular phone which is just one example of electrical apparatuses. However, the invention is not limited to communication apparatuses such as cellular phones or PHSs (Personal Handyphone Systems) or portable information terminals such as electronic dictionaries or PDAs (Personal Data Assistances), but may be effectively applied to various electronic apparatuses in which a sub-module such as a camera module is supported so as to be rotatably moved between a storage position and an expansion position with respect to an apparatus case.

As described with reference to the embodiment, there is provided an electronic apparatus which includes a sub-module supported so as rotatably move between a storage position and an expansion position with respect to an apparatus case, so that a detent mechanism for holding the sub-module at the storage position and at the expansion position can be simplified and the space can be reduced.

According to one embodiment of the present invention, the one-side holding engagement portion of the detent spring mounted between the supporting shaft and the bearing hole and the other-side holding engagement portion formed in one of the supporting shaft and the bearing hole are combined to form the detent mechanism for positioning the sub-module. With such a configuration, it is possible to simplify the configuration and reduce a space since the number of constituent elements of the detent mechanism is small, compared with the known electronic apparatus.

According to one embodiment of the present invention, the detent protrusion as the one-side holding engagement portion is formed in the detent spring fixed to the supporting shaft of the sub-module, and the detent groove as the other-side holding engagement portion is formed in the inner circumference of the bearing hole of the apparatus case. With such a configuration, it is possible to simplify the configuration and reduce a space since the number of constituent elements of the detent mechanism is small, compared with the known electronic apparatus.

According to one embodiment of the present invention, the relief portion for allowing the deformation of the detent protrusion is formed in the outer circumference of the supporting shaft. With such a configuration, since the detent protrusion of the detent spring can be easily deformed when the sub-module rotatably moves, it is possible to rotatably move the sub-module in a smooth manner.

What is claimed is:

1. An electronic apparatus comprising:
a main body that has a bearing hole having a first retaining portion and a second retaining portion;
a sub module that has a shaft rotatably coupled with the bearing hole so that the sub module is movable between a first position and a second position; and
a detent spring that is coupled with the shaft to keep the sub module at the first position and at the second position, the detent spring having a third retaining portion,
wherein the third retaining portion couples with the first retaining portion when the sub module is kept at the first position,
wherein the third retaining portion couples with the second retaining portion when the sub module is kept at the second position,
wherein the detent spring is fixed to the shaft, and is mounted between an outer surface of the shaft and an inner surface of the bearing hole,
wherein the third retaining portion is formed as a detent protrusion, and
wherein the first retaining portion and the second retaining portion are formed as detent recesses.

2. The electronic apparatus according to claim 1, wherein the shaft has a clearance portion in the vicinity of the third retaining portion for deformation of the detent spring.

3. An electronic apparatus comprising:
a main body that has a bearing hole;
a sub module that has a shaft rotatably coupled with the bearing hole so that the sub module is movable between a first position and a second position, the shaft having a first retaining portion and a second retaining portion; and
a detent spring that is coupled with the bearing hole to keep the sub module at the first position and at the second position, the detent spring having a third retaining portion,
wherein the third retaining portion couples with the first retaining portion when the sub module is kept at the first position,
wherein the third retaining portion couples with the second retaining portion when the sub module is kept at the second position,
wherein the detent spring is fixed to the bearing hole, and is mounted between an outer surface of the shaft and an inner surface of the bearing hole,
wherein the third retaining portion is formed as a detent protrusion, and
wherein the first retaining portion and the second retaining portion are formed as detent recesses.

4. The electronic apparatus according to claim 3, wherein the bearing hole has a clearance portion in the vicinity of the third retaining portion for deformation of the detent spring.

5. An electronic apparatus comprising:
a main body that has a bearing hole;
a sub module that has a shaft rotatably coupled with the bearing hole so that the sub module is movable between a first position and a second position, the shaft having a first retaining portion and a second retaining portion; and
a detent spring that is coupled with the bearing hole to keep the sub module at the first position and at the second position, the detent spring having a third retaining portion,
wherein the detent spring is coupled with the bearing hole such that the shaft of the sub module is rotatable with respect to the detent spring,
wherein the third retaining portion couples with the first retaining portion when the sub module is kept at the first position, and
wherein the third retaining portion couples with the second retaining portion when the sub module is kept at the second position.

6. The electronic apparatus according to claim 5, wherein the detent spring is fixed to the bearing hole,
wherein the third retaining portion is formed as a detent protrusion, and
wherein the first retaining portion and the second retaining portion are formed as detent recesses.

7. The electronic apparatus according to claim 5, wherein the bearing hole has a clearance portion in the vicinity of the third retaining portion for deformation of the detent spring.

* * * * *